United States Patent
Fujiwara et al.

[11] Patent Number: 6,133,189
[45] Date of Patent: *Oct. 17, 2000

[54] α-OLEFIN POLYMERIZATION CATALYST AND PROCESS FOR PRODUCING α-OLEFIN POLYMER

[75] Inventors: Yasuki Fujiwara, Sodegaura; Makoto Satoh; Akio Imai, both of Ichihara, all of Japan

[73] Assignee: Sumitomo Chemical Company, Limited, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/660,757

[22] Filed: Jun. 6, 1996

[30] Foreign Application Priority Data

Jun. 7, 1995 [JP] Japan ................... 7-140431

[51] Int. Cl.$^7$ ................... B01J 31/00
[52] U.S. Cl. ................... 502/116; 502/125; 502/115; 502/120; 502/103; 526/142
[58] Field of Search ................... 502/116, 125, 502/115, 120, 103; 526/142

[56] References Cited

U.S. PATENT DOCUMENTS

| | | | |
|---|---|---|---|
| 4,490,513 | 12/1984 | Minami et al. | 502/116 |
| 4,507,450 | 3/1985 | Kakogawa et al. | 502/116 |
| 4,693,990 | 9/1987 | Hiroyuki et al. | 526/128 |

(List continued on next page.)

FOREIGN PATENT DOCUMENTS

| | | |
|---|---|---|
| 0350170 | 1/1990 | European Pat. Off. |
| 0368344 | 5/1990 | European Pat. Off. |
| 0459009 | 12/1991 | European Pat. Off. |
| 0530814 | 3/1993 | European Pat. Off. |
| 0576411 | 12/1993 | European Pat. Off. |
| 0657477 | 6/1995 | European Pat. Off. |
| 0676419 | 10/1995 | European Pat. Off. |
| 61-78803 | 4/1986 | Japan. |
| 6-211706 | 1/1987 | Japan. |
| 6-256412 | 9/1994 | Japan. |
| WO 95/21203 | 8/1995 | WIPO. |

OTHER PUBLICATIONS

Chadwick, John C., Van Kessel, Gerard M. M., and Sudmeijer, Olof. "Regio– and stereospecificity in propene polymerization iwth MgCl$_2$–supported Ziegler–Natta catalysts: effects of hydrogen and the external donor", *1297 Macromolecular Chemistry and Physics*, vol. 196, (1995), May, No. 5, Hüthig & Wepf Verlag, Zug, Switzerland, pp. 1431–1437.

WPI Abstract of JP–57–063310–A (corresponding to U.S. Pat. 4,952,649) (Date Uncertain).

WPI Abstract of JP–58–083006–A (Date Uncertain).

(List continued on next page.)

*Primary Examiner*—David W. Wu
*Assistant Examiner*—Ling-Siu Choi
*Attorney, Agent, or Firm*—Stevens, Davis, Miller & Mosher, L.L.P.

[57] ABSTRACT

An α-olefin polymerization catalyst which comprises:

(A) a solid catalyst component containing a tetra-valent titanium obtained by treating a magnesium compound having an Mg—O bond in its molecule with a titanium halide;

(B) an organoaluminum compound; and (C) an organosilicon compound represented by the general formula $R^1R^2Si(OR^3)_2$ wherein $R^1$ represents a hydrocarbon group having 4 to 30 carbon atoms wherein a carbon bonded directly to Si is a tertiary carbon, $R^2$ represents a straight chain hydrocarbon group having 2 to 10 carbon atoms and $R^3$ represents a hydrocarbon group having 1 to 10 carbon atoms, or the general formula $R^4R^5Si(OR^6)_2$ wherein $R^4$ and $R^5$ are hydrocarbon groups having an alicyclic hydrocarbon having 5 carbon atoms as a basic structure, $R^4$ and $R^5$ may be the same or different, and $R^6$ represents a hydrocarbon group having 1 to 10 carbon atoms, and a process for producing α-olefin with said catalyst.

7 Claims, 1 Drawing Sheet

U.S. PATENT DOCUMENTS

| | | |
|---|---|---|
| 4,816,433 | 3/1989 | Terano et al. . |
| 4,839,321 | 6/1989 | Murai et al. . |
| 4,927,797 | 5/1990 | Ewen .................................. 502/127 |
| 4,952,649 | 8/1990 | Kioka et al. ....................... 526/125 |
| 4,990,479 | 2/1991 | Ishimaru et al. .................. 502/125 |
| 5,130,284 | 7/1992 | Terano et al. ..................... 502/125 |
| 5,308,818 | 5/1994 | Shamshoum et al. ............ 502/127 |
| 5,494,872 | 2/1996 | Hosaka et al. .................... 502/115 |
| 5,498,770 | 3/1996 | Hosaka et al. .................... 502/116 |
| 5,608,018 | 3/1997 | Ebara et al. ...................... 526/119 |

OTHER PUBLICATIONS

WPI Abstract of JP–61–078803–A (Date Uncertain).
WPI Abstract of JP–4–008709–A (corresponding to U.S. Pat. 5,130,284) (Date Uncertain).
WPI Abstract of JP–62–011706–A (Date Uncertain).
WPI Abstract of JP–6–256412–A (Date Uncertain).

α-OLEFIN POLYMERIZATION CATALYST AND PROCESS FOR PRODUCING α-OLEFIN POLYMER

BACKGROUND OF THE INVENTION

1. Field of the Invention

The present invention relates to an α-olefin polymerization catalyst and a process for producing an α-olefin polymer. Particularly, the present invention relates to a catalyst having extremely high catalytic activity and giving an α-olefin polymer having an extremely high stereoregularity, and a process for producing an α-olefin polymer with said catalyst.

2. Prior Art

As a process for producing a polymer of α-olefin such as propylene, butene-1 and the like, it is well known that the so-called Ziegler-Natta catalyst comprising the transition metal compound of the 4th to 6th Groups in the Periodic Table and the organometallic compound of the 1st, 2nd and 13th Groups is used. In the production of an α-olefin polymer, an amorphous polymer is produced as a by-product in addition to a high stereo-regular α-olefin polymer having a high value for an industrial application. This amorphous polymer has a little value for an industrial application and effects largely a bad influence on mechanical properties, when the α-olefin polymer is molded to a molded article, a film, a fiber and other fabricated goods to be used. Besides, the formation of an amorphous polymer causes the loss of a raw material monomer and at the same time, an apparatus for removing the amorphous polymer becomes necessary to cause an extremely large disadvantage from an industrial viewpoint. Therefore, it is necessary that a catalyst for producing an α-olefin polymer produces no amorphous polymer or produces rarely little. Further, in an α-olefin polymer obtained, a catalyst residue comprising a transition metal compound and an organometallic compound remains. As this catalyst residue causes problems in the various points of the stability, processability and the like of the α-olefin polymer, an apparatus for removing the catalyst residue and stabilizing the α-olefin polymer becomes necessary. This drawback can be improved by enlarging a catalyst activity represented by the weight of an α-olefin polymer produced per the unit weight of a catalyst, the above-mentioned apparatus for removing the catalyst residue becomes unnecessary and the reduction of the manufacturing cost of α-olefin polymer also becomes possible.

By using a supporting type solid catalyst obtained by treating a magnesium halogenide with an organic ester compound and supporting a tetra-valent titanium halogenide on the treated magnesium halogenide, or a solid catalyst obtained by treating diethoxymagnesium which has Mg—O bonds with phthaloyl dichloride and titanium tetrachloride, the organoaluminum compound of a promotor and the organosilicon compound of the third component of polymerization in combination, it is known that a certain measure of the highly stereo-regular and highly active polymerization of α-olefin can be realized. (Japanese Patent Publication (Unexamined) sho Nos. 57-63310, 58-83006 and 61-78803, and Japanese Patent Publication (unexamined) No. Hei No.4-8709) It is known that the highly stereo-regular and highly active polymerization of α-olefin can be realized to a certain extent by a similar combination in a Ti—Mg complex type solid catalyst obtained by reducing a tetra-valent titanium compound by an organomagnesium compound in the coexistence of an organosilicon compound and forming a magnesium-titanium eutectic mixture. (Japanese Patent Publication (Examined) Hei Nos.3-43283 and 1-319508)

Furthermore, by using dicyclopentyldimethoxysilane as the organosilicon compound of the third component of in a catalyst system, a supporting type solid catalyst obtained by supporting a tetra-valent titanium halogenide on a magnesium halogenide, and the organoaluminum compound as co-catalyst component in combination, it is known that a certain measure of the highly stereo-regular and highly active polymerization of α-olefin can be realized. (Japanese Patent Publication (Unexamined) Hei No.2-84404) In any case, a non-extraction and non-deashing process is in a possible level but furthermore, a more improvement is desired. In the concrete, in order to make an α-olefin polymer having high quality, the realization of a further highly stereo-regular polymerization is desired. Particularly, in a use such as a field for molding wherein it is desired to make a polymer having high rigidity, a highly stereo-regular polymer brings directly out the quality of a high rigidity and therefore, the appearance of a catalyst having a further highly stereoregular polymerizability is acutely desired.

SUMMARY OF THE INVENTION

An object of the present invention is to provide an α-olefin polymerization catalyst with high stereoregularity and high catalyst activity enough to be unnecessary for removing a catalyst residue and an amorphous polymer by using a specific solid catalyst component and organosilicon compound, and to provide a process for producing an α-olefin polymer having a high stereo-regularity of high quality.

According to the present invention, there is provided a catalyst for polymerizing an α-olefin comprising:
(A) a solid catalyst component containing a tetra-valent titanium obtained by treating a magnesium compound having an Mg—O bond with a titanium halogenide;
(B) an organoaluminum compound; and
(C) an organosilicon compound represented by the general formula $R^1R^2Si(OR^3)_2$ (wherein $R^1$ represents a hydrocarbon group having 4 to 30 carbon atoms wherein a carbon bonded directly to Si is a tertiary carbon, $R^2$ represents a straight chain hydrocarbon group having 2 to 20 carbon atoms and $R^3$ represents a hydrocarbon group having 1 to 10 carbon atoms.), or the general formula $R^4R^5Si(OR^6)_2$ (wherein $R^4$ and $R^5$ are hydrocarbon groups having an alicyclic hydrocarbon having 5 carbon atoms as a basic structure and $R^4$ and $R^5$ may be the same or different. $R^6$ represents a hydrocarbon group having 1 to 10 carbon atoms.), and a process for producing an α-olefin polymer comprising homopolymerizing or copolymerizing an α-olefin with said catalyst.

By using the present catalyst, the polymerization with a high polymerization activity of an α-olefin and a high stereoregularity of the fore-mentioned object is achieved. The present invention is illustrated in detail as follows.

Figure 1:
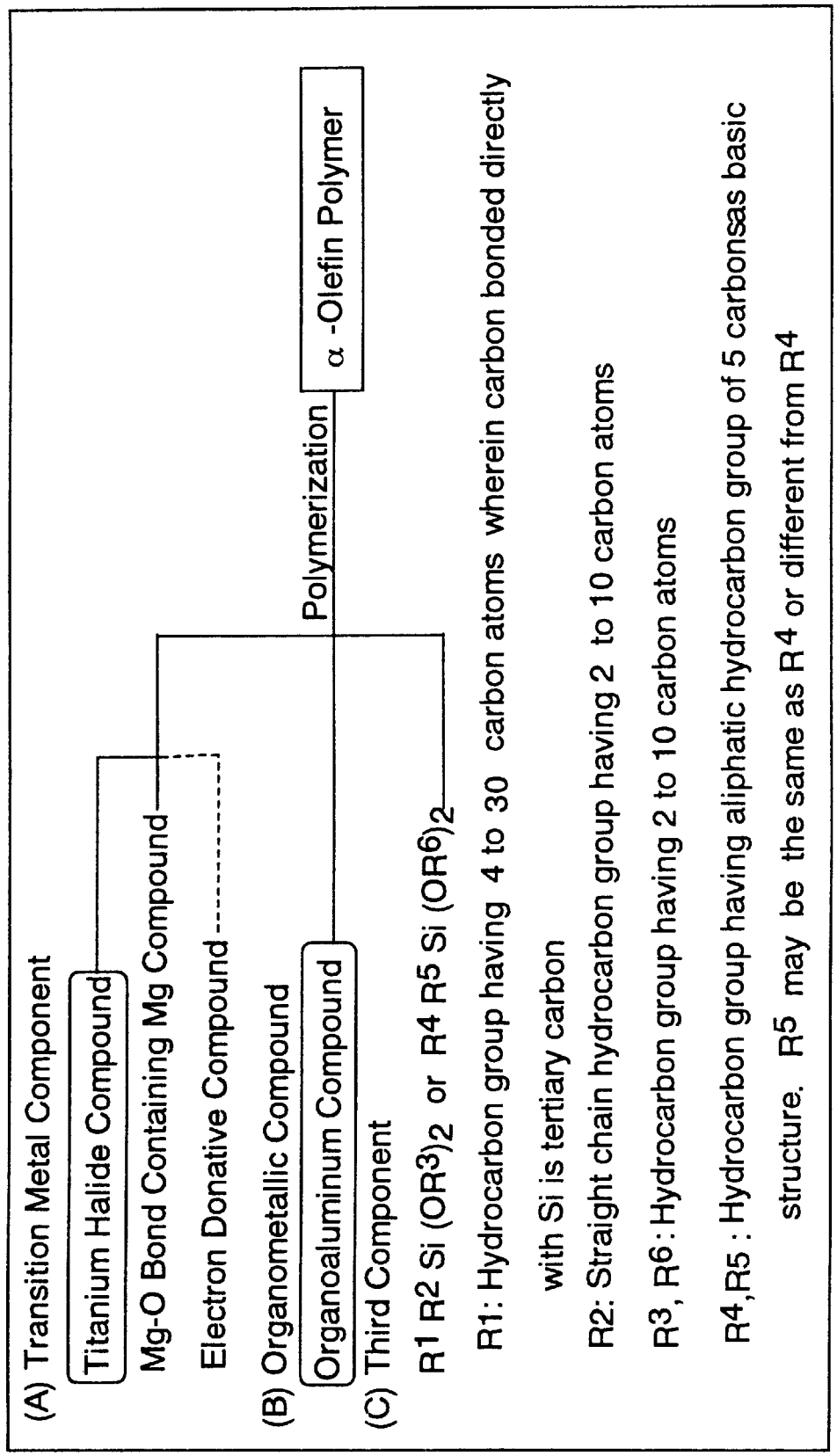
FIG. 1 is a flow-chart diagram facilitating the understanding of the present invention. The present flow-chart is a representative of embodiments of the present invention.

DETAILED DESCRIPTION OF THE INVENTION (a) Magnesium compound having Mg—O bond As the magnesium compound having an Mg—O bond, the one having substantially an Mg—O bond is not particularly restricted and, for example, magnesium compounds represented by the general formulae $Mg(OR^7)_n(OR^8)_{2-n}$, $Mg(OCOR^9)_n(OCOR^{10})_{2-n}$ and $Mg(OR\ 11)_n(OCOR^{12})_{2-n}$ are illustrated. Furthermore, the reaction product of a magnesium compound represented by the general formula $R^{13}R^{14}Mg$ or $R^{15}MgX$ and an organic compound having —$OR^6$, —$OCOR^{17}$ or —$COOR^{18}$ group and containing the 1st, 2nd, 13th or 14th Group element can be preferably used but particularly, a reaction product with the organosilicon compound having an Si—O bond can be more suitably used. When a magnesium compound except the magnesium compound having an Mg—O bond is used, it is not preferred that an amorphous polymer having no value for an industrial application is formed in a large amount. ($R^7$ to $R^{18}$ represent hydrocarbon groups having 1 to 20 carbon atoms and n represents a number satisfying $0 \leq n \leq 2$.)

(b) Titanium halide compound

As the titanium halogenide compound (b) used for the synthesis of the solid catalyst component (A) in the present invention, there is illustrated a titanium compound represented by the general formula $Ti(OR^{19})_aX_{4-a}$ ($R^{19}$ represents a hydrocarbon group having 1 to 20 carbon atoms, X represents a halogen atom and a represents a number satisfying $0 \leq a \leq 4$.). The example of $R^{19}$ includes an alkyl group such as methyl, ethyl, propyl, isopropyl, butyl, isobutyl, tert-butyl, amyl, iso-amyl, tert-amyl, hexyl, heptyl, octyl, decyl, dodecyl or the like; an aryl group such as phenyl, cresyl, xylyl, naphthyl or the like; an allyl group such as propenyl or the like; an aralkyl group such as benzyl or the like. Among these, an alkyl group having 2 to 18 carbon atoms and an aryl group having 6 to 18 carbon atoms are preferred. A titanium compound having 2 or more different $OR^{21}$ groups can be used. The examples of halogen atom represented by X can include chlorine, bromine and iodine. Among these, particularly chlorine gives a preferable result. a is a number satisfying $0 \leq a \leq 4$, preferably $0 \leq a \leq 2$ and more preferably $a=0$.

(c) Electron donative compound

The solid catalyst component (A) in the present invention is synthesized by mixing the magnesium compound having an Mg—O bond (a) and the titanium halide compound (b), and optionally, the electron donative compound. As electron donative compounds, there are illustrated electron donors containing oxygen such as alcohols, phenols, ketones, aldehydes, carboxylic acids, esters of organic acids or inorganic acids, ethers, acid amides, acid anhydrides and the like; electron donors containing nitrogen such as ammonias, amines, nitriles, isocyanates and the like; and the like. Among these electron donors, esters of organic acids and ethers are preferably used.

As esters of organic acids, mono- and poly-carboxylates are used and these examples include saturated aliphatic carboxylates, unsaturated aliphatic carboxylates, alicyclic carboxylates and aromatic carboxylates. Furthermore, as ethers, there can be illustrated a dialkyl ether and a diether compound represented by the general formula;

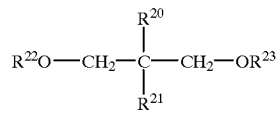

(wherein each of $R^{20}$ to $R^{23}$ is a straight or branched alkyl, alicyclic hydrocarbon, aryl, alkylaryl or arylalkyl group having 1 to 20 carbon atoms and $R^{20}$ or $R^{21}$ may be hydrogen.)

(d) Synthesis of solid catalyst component (A)

The synthetic reaction of the solid catalyst component (A) is carried out under an atmosphere of an inert gas such as nitrogen, argon and the like, and as the methods, the examples are follows:

(1) The magnesium compound having an Mg—O bond (a) and the titanium halide (b) and the electron-donative compound (c) are contacted at the same time to be reacted.

(2) (c) is reacted after (a) and (b) are reacted.

(3) (b) is reacted after (a) and (c) are reacted.

(4) (a) is reacted after (b) and (c) are reacted.

The order of the reaction is not particularly limited and the method (3) is preferred. Each contact reaction can be repeated several times. The compound is preferably uesd as dissolved or diluted in an appropriate solvent at the synthesis. As these solvents, there can be used aliphatic hydrocarbons such as pentane, hexane, heptane, octane, decane and the like; aromatic hydrocarbons such as benzene, toluene, xylene and the like; alicyclic hydrocarbons such as cyclohexane, cyclopentane and the like; halogenated hydrocarbons such as 1,2-dichloroethane, monochlorobenzene and the like. Among these, aromatic hydrocarbons and halogenated hydrocarbons are particularly preferred. When (a), (b) and (c) are added to the reaction system, an ether compound such as diethyl ether, dibutyl ether, diisoamyl ether, tetrahydrofuran or the like can be added. The reaction temperature is 30 to 150° C., preferably 45 to 135° C. and particularly preferably 60 to 120° C. The reaction time is not particularly restricted and it is usually from about 30 minutes to about 6 hours.

After the solid catalyst component containing the tetravalent titanium compound obtained by the above-mentioned method was separated by solid-liquid separation, it was washed several times by an inert hydrocarbon solvent such as hexane, heptane or the like and successively used for polymerization. After the solid-liquid separation, it was washed once or more with a large amount of a halogenated hydrocarbon such as monochlorobenzene or the like, or an aromatic hydrocarbon such as toluene or the like at the temperature of 50 to 120° C., and furthermore, after it was washed several times with an aliphatic hydrocarbon such as hexane or the like, it is preferred to be used for the polymerization from the viewpoint of a catalyst activity and a stereo-regularity of α-olefin polymer to be obtained.

(e) Organoaluminum compound

As the organoaluminum compound used in the present invention, the one having at least one Al-carbon bond in its molecule. The representative one is shown by the general formula as follows.

$$R^{24}Al_\gamma Y_{3-\gamma}$$

$$R^{25}R^{26}Al\text{—}O\text{—}AlR^{27}R^{28}$$

($R^{24}$ to $R^{28}$ represent hydrocarbon groups having 1 to 20 carbon atoms, Y represents halogen, hydrogen or an alkoxy group, preferably having 1 to 20 carbon atoms and 7 represents a number satisfying $2 \leq \gamma \leq 3$.). The examples of the organoaluminum compound include trialkylaluminums such as triethylaluminum, triisobutylaluminum, trihexylaluminum and the like; dialkylaluminum hydrides such as diethylaluminum hydride, diisobutylaluminum hydride and the like; dialkylaluminum halides such as diethylaluminum chloride and the like; mixtures of trialkylaluminums and dialkylaluminum halides such as a mixture of triethylaluminum and diethylaluminum chloride; alkylalumoxanes such as tetraethyldialumoxane, tetrabutyldialumoxane and the like. Among these, trialkylaluminums, mixtures of trialkylaluminums and dialkylaluminum halides and alkylalumoxanes are preferred, and particularly, triethylaluminum, triisobutylaluminum, a mixture of triethylaluminum and diethylaluminum chloride, and tetraethyldialumoxane are preferred.

(f) Organosilicon compound (C)

The organosilicon compound (C) used in the present invention is an organosilicon compound (Cl) represented by the general formula $R^1R^2Si(OR^3)_2$ (wherein $R^1$ represents a hydrocarbon group having 4 to 30 carbon atoms wherein a carbon bonded directly to Si is a tertiary carbon, $R^2$ represents a straight chain hydrocarbon group having 2 to 20 carbon atoms and $R^3$ represents a hydrocarbon group having 1 to 10 carbon atoms.), or an organosilicon compound (C2) represented by the general formula $R^4R^5Si(OR^6)_2$ (wherein $R^4$ and $R^5$ are hydrocarbon groups having an alicyclic hydrocarbon having 5 carbon atoms as a basic structure and $R^4$ and $R^5$ may be the same or different. $R^6$ represents a hydrocarbon group having 1 to 10 carbon atoms.). By using the organosilicon compound having these structures, a highly active and highly stereo-regular polymerization can be attained. The examples of the organosilicon compound include tert-butylethyldimethoxysilane, tert-butyl-n-propyldimethoxysilane, tert-butyl-n-butyldimethoxysilane, tert-butyl-n-pentyldimethoxysilane, tert-butyl-n-hexyldimethoxysilane, tert-butyl-n-propyldiethoxysilane, tert-butyl-n-butyldiethoxysilane, tert-butyl-n-pentyldiethoxysilane, tert-butyl-n-hexyldiethoxysilane, tert-amylethyldimethoxysilane, tert-amyl-n-propyldimethoxysilane, tert-amyl-n-butyldimethoxysilane, tert-amyl-n-pentyldimethoxysilane, tert-amyl-n-hexyldimethoxysilane, tert-amyl-n-propyldiethoxysilane, tert-amyl-n-butyldiethoxysilane tert-amyl-n-pentyldiethoxysilane, tert-amyl-n-hexyldiethoxysilane, dicyclopentyldimethoxysilane, bis(2-methylcyclopentyl)dimethoxydilane bis(tert-butylcyclopentyl)dimethoxysilane bis(2,3-dimethylcyclopentyl)dimethoxysilane bis(2,5-dimethylcyclopenbyl)dimethoxysilane, dicyclopentyldiethoxysilane, bis(2-methylcyclopentyl)diethoxysilane, bis(tert-butylcyclopentyl)diethoxysilane bis(2,3-dimethylcyclopentyl)diethoxysilane, bis(2,5-dimethylcyclopentyl)diethoxysilane, dicyclopentenyldimethoxysilane, bis(2-methylcyclopentenyl)dimethoxysilane, bis(tert-butylcyclopentenyl)dimethoxysilane, bis(2,3-dimethylcyclopentenyl)dimethoxysilane bis(2,5-dimethylcyclopentenyl)dimethoxysilane, dicyclopentenyldiethoxysilane, bis(2-methylcyclopentenyl)diethoxysilane, bis(tert-butylcyclopentenyl)diethoxysilane, bis(2,3-dimethylcyclopentenyl)diethoxysilane, bis(2,5-dimethylcyclopentenyl)diethoxysilane and the like. Tert-butylethyldimethoxysilane, tert-butyl-n-propyldimethoxysilane and dicyclopentyldimethoxysilane are preferred.

(g) Process for polymerizing α-olefin

The α-olefin applied to the stereo-regular polymerization with the catalyst of the present invention is an α-olefin having 3 or more carbon atoms. The examples include straight chain α-olefins such as propylene, butene-1, pentene-1, hexene-1, heptene-1, octene-1, decene-1 and the like; branched α-olefins such as 3-methylbutene-1,3-methylpentene-1,4-methylpentene-1 and the like; vinylcyclohexane and the like. These α-olefins may be used alone or in combination of at least two α-olefins. Among these α-olefins, it is preferred to homopolymerize propylene or butene-1 or copolymerize a mixture of α-olefins comprising propylene as a main component. It is particularly preferred to homopolymerize propylene or copolymerize the mixture of olefins comprising propylene as the main component. In the copolymerization of the present invention, the mixture of ethylene and at least one of the α-olefin selected from the above-mentioned α-olefins can be used. Furthermore, it is possible to use a compound having an unsaturated bond such as a conjugated diene and a non-conjugated diene for copolymerization. And a hetero-block copolymerization performed by 2 steps or more of polymerization can be easily performed.

As the method feeding each catalyst component in a polymerization vessel, there is particularly no condition to be restricted except feeding in the water-free state under an inert gas such as nitrogen, argon or the like.

The solid catalyst component (A), the organoaluminum compound (B) and the organosilicon compound (C) may be fed separately and either two components of them are previously contacted and then they may be fed.

In the present invention, it is possible to polymerize olefins in the presence of the above-mentioned catalyst but a preliminary polymerization mentioned afterward may be carried out prior to the above polymerization (hereinafter, referred to as "polymerization" or "main polymerization").

The preliminary polymerization is carried out in the presence of the solid catalyst component (A) and the organoaluminum compound (B) by feeding a small amount of α-olefins and is preferably carried out in a slurry state. As a solvent used for slurring, an inert hydrocarbon such as propane, butane, isobutane, pentane, isopentane, hexane, heptane, octane, cyclohexane, benzene or toluene can be illustrated. In the formation of slurry, a part or the all of the inert hydrocarbon may be substituted with a liquid α-olefin. The amount of the organoaluminum compound used in the preliminary polymerization can be selected at 0.5 to 700 mol per 1 mol of a titanium atom in the solid catalyst component, 0.8 to 500 mol is preferred and 1 to 200 mol is particularly preferred.

The amount of the α-olefin polymerized in the preliminary polymerization is 0.01 to 1000 g, preferably 0.05 to 500 g and more preferably 0.1 to 200 g per 1 g of the solid catalyst component. A slurry concentration in the preliminary polymerization is preferably 1 to 500 g-the solid catalyst component (A)/liter-solvent and particularly preferably 3 to 300 g-the solid catalyst component (A)/liter-solvent. The temperature of the preliminary polymerization is preferably −20 to 100° C. and more preferably 0 to 80° C.

The partial pressure of the α-olefin at a gas phase part in the preliminary polymerization is preferably 0.01 to 20 $kg/cm^2$ and more preferably 0.1 to 10 $kg/cm^2$, but an α-olefin being liquid at the pressure and temperature of the preliminary polymerization is not applied thereto.

Furthermore, the preliminary polymerization time is not particularly limited and 2 minutes to 15 hours is usually preferred.

In the preliminary polymerization, as a method feeding the solid catalyst component (A), the organoaluminum compound (B) and the α-olefin, there may be used either of a method feeding the α-olefin after the solid catalyst component (A) and the organoaluminum compound (B) are contacted, and a method feeding the organoaluminum compound (B) after the solid catalyst component (A) and the α-olefin are contacted.

As a method for feeding the α-olefin, there may be used either of a method feeding the α-olefin in order while keeping a predetermined pressure in the polymerization vessel and a method feeding all of a predetermined amount of the α-olefin at the start. A chain transfer agent such as hydrogen can be added in order to control the molecular weight of a polymer to be obtained.

Furthermore, in the preliminary polymerization of a small amount of the α-olefin with the solid catalyst component (A) in the presence of the organoaluminum compound (B), the organosilicon compound (C) may be used therewith. The amount of (C) is preferably 0.01 to 400 mol, more preferably 0.02 to 200 mol and particularly preferably 0.03 to 100 mol per 1 mol of a titanium atom contained in the solid catalyst component (A), and preferably 0.003 to 5 mol, more preferably 0.005 to 3 mol and particularly preferably 0.01 to 2 mol per 1 mol of the organoaluminum compound (B).

The feeding method of the organosilicon compound (C) in the preliminary polymerization is not particularly limited. It may be fed separately from the organoaluminum compound (B), or it may be contacted with the organoaluminum compound (B) prior to feeding.

The α-olefin used in the preliminary polymerization may be the same or different from the α-olefin used in the main polymerization.

After the preliminary polymerization was carried out as mentioned above, or without the preliminary polymerization, the main polymerization of an α-olefin can be carried out in the presence of the α-olefin polymerization catalyst comprising the above-mentioned solid catalyst component (A), the organoaluminum compound (B), and the organosilicon compound (C).

The amount of the organoaluminum compound used (B) in the present polymerization (herein-after, referred to as "polymerization" or "main polymerization") can be selected at the wide range of 1 to 1000 mol per 1 mol of a titanium atom in the solid catalyst component (A), and the range of 5 to 600 mol is particularly preferred.

The amount of the organosilicon compound (C) used in the polymerization is 0.1 to 2000 mol, preferably 0.3 to 1000 mol and more preferably 0.5 to 800 mol per 1 mol of a titanium atom contained in the solid catalyst component (A), and 0.001 to 5 mol, preferably 0.005 to 3 mol and particularly preferably 0.01 to 1 mol per 1 mol of the organoaluminum compound.

The polymerization can be carried out at a temperature of −30 to 300° C., preferably 20 to 180° C. The polymerization pressure is not particularly limited, but from industrial and economical viewpoints, the pressure of a normal pressure to 100 kg/cm$^2$ and preferably about 2 to 50 kg/cm$^2$ is adopted.

As the polymerization type, either of a batch type and a continuous type are possible. A slurry polymerization or a solution polymerization by inert hydrocarbon such as propane, butane, isobutane, pentane, hexane, heptane or octane. Furthermore, a bulk polymerization using a liquid α-olefin at the polymerization temperature as a medium or a gas phase polymerization can be adopted.

In the polymerization, it is possible to add a chain transfer agent such as hydrogen or the like in order to control the molecular weight of the polymer to be obtained.

EXAMPLE

The present invention is illustrated in detail by Examples and Comparative Examples as follows but the present invention is not limited thereto. The evaluation methods of various material properties of the polymer in Examples are as follows:

(1) Xylene-soluble part at 20° C. (hereinafter, abbreviated as CXS)

After dissolving perfectly 1 g of the polymerization powder in 200 ml of boiling xylene, it was slowly cooled to 50° C. and successively, cooled to 20° C. while immersing in ice water and stirring. After letting it be alone for 3 hours at 20° C., the polymer precipitated is separated by filtration. Xylene is evaporated from the filtrate to be dried under vacuum at 60° C. and a polymer soluble in xylene at 20° C. (amorphous polymer) is recovered. The value of CXS is the smaller and an amorphous polymer is the less. It indicates a high stereo-regularity.

(2) Intrinsic viscosity (hereinafter, abbreviated as [η]) was measured in tetralin solvent at 135° C.

(3) Bulk density was measured in accordance with JIS K-6721-1966.

Example 1

(a) Synthesis of solid catalyst component (|)

After substituting inner atmosphere of a 500 ml flask equipped with a stirrer, a dropping funnel and a thermometer with nitrogen gas, 200 ml of n-hexane and 53 ml of tetraethoxysilane were thrown into the flask and cooled to 5° C. while stirring. 183.5 ml of butylethylmagnesium (BEM manufactured by MAGARA Company Ltd., and containing 4.22% by weight of a magnesium atom) was thrown into the dropping funnel installed on the flask, and it was gradually dropped into the flask taking 3 hours. After the dropping, temperature was elevated to 60° C. and stirred for 1 hour. After the reaction, it was cooled down to room temperature, and after a solid-liquid separation, it was washed three times with 200 ml of n-hexane, and dried under vacuum and to obtain 14.93 g of a white solid. In this white solid, 70.9% by weight of an ethoxy group and 2.45% by weight of a n-butoxy group were contained.

After substituting inner atmosphere of a 200 ml flask equipped with a stirrer, a thermometer and a reflux condenser with nitrogen, 3.54 g of the above-mentioned white solid and 21 ml of toluene were thrown into the flask and stirring was started. Furthermore, to this, 14.2 ml of titanium tetrachloride was added and the temperature was elevated to 90° C. 0.71 ml of phthaloyl dichloride was added and the temperature was elevated to 115° C. and stirring was continued for 2 hours at the same temperature. After the reaction, it was separated by the solid-liquid separation at the same temperature and it was washed twice with 21 ml of toluene at the same temperature. To this, 21 ml of toluene and 14.2 ml of titanium tetrachloride were added, stirring was continued for 2 hours at 115° C., and the reacted matter was separated by the solid-liquid separation at the same temperature and was washed twice with 21 ml of toluene at the same temperature. This operation was repeated three times. Successively, the obtained solid was washed 10 times at 40° C. with 71 ml of n-hexane and dried further under vacuum to obtain 3.30 g of a solid catalyst component. In the solid catalyst component, 2.07% by weight of a titanium atom and 9.80% by weight of phthalate were contained.

(b) Polymerization of propylene

Inner atmosphere of a 3-liter stirring type stainless autoclave was substituted with argon, and 2.6 mmol of triethylaluminum as the organoaluminum compound (B), 0.26 mmol of tert-butyl-n-propyldimethoxysilane as the organosilicon compound (C) and 3.4 mg of the solid catalyst component synthesized in the above-mentioned (a) as the solid catalyst component (A) were fed into the autoclave and hydrogen corresponding to a partial pressure of 0.33 kg/cm$^2$ was added. Subsequently, 780 g of liquid propylene was fed, the temperature of the autoclave was elevated to 80° C. and the polymerization was carried out for 1 hour at 80° C. After the polymerization, an unreacted monomer was purged. The polymer produced was dried under vacuum for 2 hours at 60° C. to obtain 234 g of the polypropylene powder.

Therefore, the yield of the polypropylene per 1 g of the solid catalyst component (A) (hereinafter, abbreviated as "PP/Cat") was 68,800 (g/g). The ratio of the component soluble in xylene at 20° C. contained in the total polypropylene (hereinafter, abbreviated to as "CXS") was 0.75 (wt %), the intrinsic viscosity of the polymer ([η]) was=2.63 and the bulk density was 0.370 (g/ml).

Comparative Example 1

(a) Synthesis of solid catalyst component (∥)

The synthesis of the solid catalyst component was carried out as follows according to the example 1 described in Japanese Patent Publication (Unexamined) Sho No.58-83006(1983).

After substituting inner atmosphere of a 200 ml flask equipped with a stirrer and a thermometer with nitrogen, 13.2 g of a commercial anhydrous magnesium chloride solid, 70 ml of n-decane and 65 ml of 2-ethylhexanol were thrown into the flask and reacted for 4 hours at 130° C. After 3.09 g of phthalic anhydride was further added to this and reacted for 1 hour, it was cooled down to room temperature to obtain a homogeneous solution.

After substituting inner atmosphere of 1-liter flask equipped with a stirrer, a dropping funnel and a thermometer with nitrogen, 560 ml of titanium tetrachloride was thrown into the flask to be cooled at −20° C. Into the dropping funnel installed on the flask, the above-mentioned total reaction solution was thrown and gradually dropped into the flask taking 1 hour. After the dropping, a temperature was elevated to room temperature taking 1.25 hours and elevated to 110° C. taking 3 hours. To this, 7.8 ml of diisobutylphthalate was added and reacted for 2 hours at 110° C. After the reaction, it was separated by the solid-liquid separation at the same temperature and thus obtained solid was washed 5 times with 100 ml of LP-20 (manufactured by Idemitsu Petrochemical Company, Ltd.) at the same temperature, 3 times at room temperature with 150 ml of n-hexane, and was dried under vacuum to obtain 15.78 g of the solid catalyst component.

In the solid catalyst component, 1.61% by weight of a titanium atom and 4.5% by weight of phthalate were contained.

(b) Polymerization of propylene

It was carried out in the same manner as in Example 1 (b). except that the solid catalyst component obtained in the above-mentioned (a) was used as the solid catalyst component. The PP/Cat was 41,500 (g/g) and the polymerization activity was low as compared with Example 1. The CXS was 1.6 (wt %) and large as compared with Example 1, and the stereo-regularity was low. The intrinsic viscosity of the polymer ([η]) was 2.36 (dl/g) and the bulk density was 0.426 (g/ml).

Example 2

(a) Polymerization of propylene

The polymerization of propylene was carried out in the same manner as in Example 1 (b) except using dicyclopentyldimethoxysilane in place of tert-butyl-n-propyldimethoxysilane as the organosilicon compound (C). The PP/Cat was 70,900 (g/g) and the polymerization activity was high. The CXS was small as 0.53 (wt %), and the stereo-regularity was high. The intrinsic viscosity [η] was 2.66 (dl/g) and the bulk density was 0.378 (g/ml).

Comparative Example 2

(a) Polymerization of propylene

The polymerization of propylene was carried out in the same manner as in Example 2 (a) except using the same one as Comparative Example 1 (a) as the solid catalyst component. The PP/Cat was 29,300 (g/g) and small as compared with Example 2, and the polymerization activity was low. The CXS was large as 1.2 (wt %) in comparison with Example 2 and the stereo-regularity was low. The intrinsic viscosity [η] was 2.35 (dl/g) and the bulk density was 0.432 (g/ml).

Example 3

(a) Polymerization of propylene

The polymerization of propylene was carried out in the same manner as in Example 1 (b) except using tert-butylethyldimethoxysilane in place of tert-butyl-n-propyldimethoxysilane as the organosilicon compound (C). The PP/Cat was high as 70,900 (g/g). The CXS was small as 0.75 (wt %), and the stereo-regularity was high. The intrinsic viscosity [η] was 2.37 (dl/g) and the bulk density was 0.349 (g/ml).

Comparative Example 3

(a) Polymerization of propylene

The polymerization of propylene was carried out in the same manner as in Example 1 (b) except using cyclohexylethyldimethoxysilane in place of tert-butyl-n-propyldimethoxysilane as the organosilicon compound (C). PP/Cat was 67,800 (g/g). The CXS was large as 0.81 (wt %) as compared with Examples 1 to 3 and the stereo-regularity was low. The intrinsic viscosity [η] was 1.92 dl/g and the bulk density was 0.365 (g/ml).

Comparative Example 4

(a) Polymerization of propylene

The polymerization of propylene was carried out in the same manner as in Example 1 (b) except using tert-butylmethyldimethoxysilane in place of tert-butyl-n-propyldimethoxysilane as the organosilicon compound (C). The yield of the polypropylene per 1 g of the solid catalyst component was PP/Cat=56,000 (g/g) being small as compared with Examples 1 to 3 and the polymerization activity was low. The CXS was large as 0.92 (wt %) as compared with Examples 1 to 3 and the stereo-regularity was low. The intrinsic viscosity [η] was 2.12 (dl/g) and the bulk density was 0.368 (g/ml).

Comparative Example 5

(a) Polymerization of propylene

The polymerization of propylene was carried out in the same manner as in Example 1 (b) except using tert-butylisopropyldimethoxysilane in place of tert-butyl-n-propyldimethoxysilane as the organosilicon compound (C). PP/Cat was 74,200 (g/g). CXS was large as 0.87 (wt %) as compared with Examples 1 to 3 and the stereo-regularity was low. The intrinsic viscosity [η] was 2.57 (dl/g) and the bulk density was 0.355 (g/ml).

Comparative Example 6

(a) Polymerization of propylene

The polymerization of propylene was carried out in the same manner as in Example 1 (b) except using di-tert-butyldimethoxysilane in place of tert-butyl-n-propyldimethoxysilane as the organosilicon compound (C). PP/Cat was 72,300 (g/g). CXS was large as 1.40 (wt %) as compared with Examples 1 to 3 and the stereo-regularity was low. The intrinsic viscosity [η] was 3.19 (dl/g) and the bulk density was 0.364 (g/ml).

According to the present invention, there are provided an α-olefin polymerization catalyst having a high catalyst activity and giving a highly stereo-regular α-olefin polymer to be unnecessary for removing a catalyst residue and an amorphous polymer by using a specific solid catalyst component and organosilicon compound, and a process for producing an α-olefin polymer having a high stereoregularity of high quality.

What is claimed is:

1. An α-olefin polymerization catalyst which comprises:
(A) a solid catalyst component containing a tetra-valent titanium obtained by treating a magnesium compound having a Mg—O bond in its molecule with a titanium halide in a solvent, separating the resulting mixture by solid-liquid separation, and washing the thus obtained solid with a halogenated hydrocarbon or an aromatic hydrocarbon at a temperature of 50 to 120° C.; and thereafter washing with an aliphatic hydrocarbon, wherein the magnesium compound is a reaction product of an organomagnesium compound with an organosilicon compound having a Si—O bond, and the titanium halide is one represented by the general formula $Ti(OR^{19})_aX_{4-a}$ ($R^{19}$ represents a hydrocarbon group having 1 to 20 carbon atoms, X represents a halogen atom and "a" represents a number satisfying $0 \leq a \leq 2$);
(B) an organoaluminum compound; and
(C) an organosilicon compound represented by the general formula $R^1R^2Si(OR^3)_2$ (wherein $R^1$ represents a hydrocarbon group having 4 to 30 carbon atoms wherein a carbon bonded directly to Si is a tertiary carbon, $R^2$ represents a straight chain hydrocarbon group having 2 to 20 carbon atoms and $R^3$ represents a hydrocarbon group having 1 to 10 carbon atoms), or the general formula $R^4R^5Si(OR^6)_2$ (wherein $R^4$ and $R^5$ are hydrocarbon groups having an alicyclic hydrocarbon having 5 carbon atoms as a basic structure, $R^4$ and $R^5$ may be the same or different, and $R^6$ represents a hydrocarbon group having 1 to 10 carbon atoms).

2. An α-olefin polymerization catalyst according to claim 1, wherein the titanium halide is a titanium tetrahalide.

3. An α-olefin polymerization catalyst according to claim 2, wherein the titanium tetrahalide is titanium tetrachloride.

4. An α-olefin polymerization catalyst according to claim 1, wherein the organosilicon compound represented by the general formula $R^1R^2Si(OR^3)_2$, wherein $R^1$ represents a hydrocarbon group having 4 to 30 carbon atoms wherein a carbon bonded directly to Si is a tertiary carbon, $R^2$ represents a straight chain hydrocarbon group having 2 to 20 carbon atoms and $R^3$ represents a hydrocarbon group having 1 to 10 carbon atoms.

5. An α-olefin polymerization catalyst according to claim 4, wherein the organosilicon compound represented by the general formula $R^1R^2Si(OR^3)_2$ is a member selected from the group consisting of tert-butylethyldimethoxysilane, tert-butyl-n-propyldimethoxysilane, tert-butyl-n-butyldimethoxysilane, tert-butyl-n-pentyldimethoxysilane, tert-butyl-n-hexyldmethoxysilane, tert-butyl-n-propyldiethoxysilane, tert-butyl-n-butyldiethoxysilane, tert-butyl-n-pentyldiethoxysilane, tert-butyl-n-hexyldiethoxysilane, tert-amylethyldimethoxysilane, tert-amyl-n-propyldimethoxysilane, tert-amyl-n-butyldimethoxysilane, tert-amyl-n-pentyldimethoxysilane, tert-amyl-n-hexyldimethoxysilane, tert-amyl-n-propyldiethoxysilane, tert-amyl-n-butyldiethoxysilane, tert-amyl-n-pentyldiethoxysilane and tert-amyl-n-hexyldiethoxysilane.

6. An α-olefin polymerization catalyst according to claim 1, wherein the organosilicon compound represented by the general formula $R^4R^5Si(OR^6)_2$ is tert-butylethyldimethoxysilane or tert-butyl-n-propyldimethoxysilane.

7. An α-olefin polymerization catalyst according to claim 1, wherein the organosilicon compound (C) is tert-butylethyldimethoxysilane, tert-butyl-n-propyldimethoxysilane or dicyclopentyldimethoxysilane.

* * * * *